(12) United States Patent
Demopoulos et al.

(10) Patent No.: US 9,348,498 B2
(45) Date of Patent: May 24, 2016

(54) WRAPPED CONTENT INTERACTION

(75) Inventors: Ryan J. Demopoulos, Bellevue, WA (US); Christine C. Stawitz, Seattle, WA (US); Moneta Ho Kushner, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 428 days.

(21) Appl. No.: 13/230,162

(22) Filed: Sep. 12, 2011

(65) Prior Publication Data

US 2013/0067396 A1 Mar. 14, 2013

(51) Int. Cl.
*G06F 3/048* (2013.01)
*G06F 3/0485* (2013.01)

(52) U.S. Cl.
CPC .......... *G06F 3/04855* (2013.01); *G06F 3/0485* (2013.01); *G06F 2203/04808* (2013.01)

(58) Field of Classification Search
CPC . G06F 1/1692; G06F 3/0485; G06F 3/04855; G06F 3/04808; G06F 2203/04808
USPC .......................................... 715/786; 345/326
See application file for complete search history.

(56) References Cited

U.S. PATENT DOCUMENTS

| | | | |
|---|---|---|---|
| 6,570,594 B1 * | 5/2003 | Wagner | G06F 3/0481 715/781 |
| 6,734,883 B1 | 5/2004 | Wynn et al. | |
| 7,411,575 B2 | 8/2008 | Hill et al. | |
| 7,802,202 B2 | 9/2010 | Fox et al. | |
| 7,940,250 B2 | 5/2011 | Forstall | |
| 9,021,386 B1 * | 4/2015 | Rasmussen et al. | 715/786 |
| 2002/0109728 A1 * | 8/2002 | Tiongson | G06F 3/04855 715/786 |
| 2004/0113952 A1 | 6/2004 | Randall | |
| 2005/0085180 A1 | 4/2005 | Ballay et al. | |
| 2005/0160374 A1 | 7/2005 | Bailey et al. | |
| 2006/0004873 A1 | 1/2006 | Wong et al. | |
| 2006/0059438 A1 | 3/2006 | Ko et al. | |
| 2006/0119586 A1 | 6/2006 | Grant et al. | |
| 2006/0123357 A1 | 6/2006 | Okamura | |
| 2006/0212829 A1 | 9/2006 | Yahiro et al. | |
| 2006/0242607 A1 | 10/2006 | Hudson | |

(Continued)

OTHER PUBLICATIONS

"Safari Features", *Apple Safari 5*, retrieved from <http://www.apple.com/safari/features.html> on Aug. 8, 2011, 11 pages.

(Continued)

*Primary Examiner* — Tuyetlien T Tran
*Assistant Examiner* — Jaime Duckworth
(74) *Attorney, Agent, or Firm* — Timothy Churna; Judy Yee; Micky Minhas

(57) ABSTRACT

Techniques for wrapped content interaction are described. In implementations, scrolling instrumentalities are employed that enable wrapped content to be navigated via various types of input, such as mouse input, keyboard input, touch input, and so on. Examples of wrapped content include a wrapped list of items, a wrapped document, a wrapped web page, and so on. Interaction with wrapped content that is initiated within a window in which the wrapped content is displayed can proceed outside the visual bounds of the window such that the content can be scrolled as looped content.

20 Claims, 8 Drawing Sheets

(56) References Cited

U.S. PATENT DOCUMENTS

| | | | |
|---|---|---|---|
| 2007/0028268 A1 | 2/2007 | Ostojic et al. | |
| 2007/0209017 A1* | 9/2007 | Gupta et al. | 715/781 |
| 2007/0211040 A1 | 9/2007 | Wang et al. | |
| 2007/0240073 A1 | 10/2007 | McCarthy et al. | |
| 2007/0245260 A1 | 10/2007 | Koppert | |
| 2008/0082939 A1 | 4/2008 | Nash et al. | |
| 2008/0250352 A1 | 10/2008 | Zaliva | |
| 2009/0002324 A1* | 1/2009 | Harbeson et al. | 345/173 |
| 2009/0231271 A1 | 9/2009 | Heubel et al. | |
| 2009/0303257 A1 | 12/2009 | Yamaguchi | |
| 2009/0313573 A1 | 12/2009 | Paek et al. | |
| 2010/0058363 A1 | 3/2010 | Brun | |
| 2010/0077353 A1 | 3/2010 | Moon et al. | |
| 2010/0087228 A1* | 4/2010 | Griffin et al. | 455/566 |
| 2010/0164895 A1 | 7/2010 | Kim et al. | |
| 2010/0169835 A1 | 7/2010 | Tabata et al. | |
| 2010/0175027 A1 | 7/2010 | Young et al. | |
| 2010/0281374 A1 | 11/2010 | Schulz et al. | |
| 2010/0333016 A1* | 12/2010 | Attwood | 715/784 |
| 2011/0016390 A1 | 1/2011 | Oh et al. | |
| 2011/0040783 A1 | 2/2011 | Uemichi et al. | |
| 2011/0087997 A1 | 4/2011 | Lee et al. | |
| 2011/0107267 A1 | 5/2011 | Ha et al. | |
| 2011/0113329 A1 | 5/2011 | Pusateri | |
| 2011/0252362 A1* | 10/2011 | Cho | G06F 3/0485 715/784 |
| 2012/0017176 A1 | 1/2012 | Choi et al. | |
| 2012/0036473 A1 | 2/2012 | Haseyama et al. | |
| 2012/0110499 A1 | 5/2012 | Hance et al. | |
| 2012/0272181 A1* | 10/2012 | Rogers et al. | 715/784 |
| 2013/0067393 A1 | 3/2013 | Demopoulos | |

OTHER PUBLICATIONS

Garcia, Jesus et al., "Sencha Touch in Action", retrieved from <http://www.manning.com/garcia2/STiA_meap_ch01.pdf> on Aug. 8, 2011,(2011), 25 pages.

Guest, Simon "jQuery Mobile Alpha 4 Released, with Support for Windows Phone 7", retrieved from <http://www.infoq.com/news/2011/04/query-mobile-alpha4> on Aug. 8, 2011, 1 page.

"Bring Infinite Swiping to Your iPhone's Home Screen with 'Wrap-around'", Retrieved at <<http://www.iphone-my.com/apps/bring-infinite-swiping-iphones-home-screen-wraparound/>>, Jun. 20, 2011, pp. 6.

"Conduits Technologies, Inc. Announces Pocket Player 3.5 for Windows Mobile 6 Standard and Professional", Retrieved at <<http://www.conduits.com/news/pr20071016.html>>, Oct. 16, 2007, pp. 3.

"Final Office Action", U.S. Appl. No. 13/230,022, Jul. 11, 2014, 20 pages.

"Non-Final Office Action", U.S. Appl. No. 13/230,022, Jan. 7, 2015, 19 pages.

Birch, "How to Mimic WordPerfect-Style 'Popup Button' Menus", Retrieved from <https://web.archive.org/web/20050327123630/http://vbnet.mvps.org/index.html?code/menu/wpmnubuttons.htm> on Jan. 7, 2015, Mar. 26, 1998, 5 pages.

Fox "Pure Visual Basic", Sams Publishing, 1st Edition, Aug. 29, 1999, 6 pages.

"Non-Final Office Action", U.S. Appl. No. 13/230,022, Apr. 8, 2014, 16 pages.

"Final Office Action", U.S. Appl. No. 13/230,022, Jun. 5, 2015, 22 pages.

"Non-Final Office Action", U.S. Appl. No. 13/230,022, Jan. 11, 2016, 18 pages.

\* cited by examiner

WRAPPED CONTENT INTERACTION

BACKGROUND

A graphical user interface often includes content that can be scrolled or otherwise manipulated within the interface. For example, a word processing application can present a list of fonts, from which a user can select a desired font. The word processing application can also display a document that can be scrolled in a graphical user interface for the application. Current scrolling mechanisms, however, are typically not adaptable to different graphical user interface and/or content configurations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for wrapped content interaction are described. In implementations, scrolling instrumentalities are employed that enable wrapped content to be navigated via various types of input, such as mouse input, keyboard input, touch input, and so on. Examples of wrapped content include a wrapped list of items, a wrapped document, a wrapped web page, and so on. Interaction with the wrapped content that is initiated within a window in which the wrapped content is displayed can proceed outside the visual bounds of the window such that the content can be scrolled as looped content.

In implementations, a wrap thumb is employed that can be manipulated to navigate wrapped content. Interaction with the wrapped content can cause the wrap thumb to be visually removed from the wrapped content. After the interaction is discontinued, the wrap thumb can be redisplayed in a position that corresponds to a position for one or more portions of the wrapped content.

In implementations, a wrap thumb can be cropped during an interaction with wrapped content to indicate a scrolling position of items and/or portions the wrapped content.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for wrapped content interaction are described. In implementations, scrolling instrumentalities are employed that enable wrapped content to be navigated via various types of input, such as mouse input, keyboard input, touch input, and so on. Examples of wrapped content include a wrapped list of items, a wrapped document, a wrapped web page, and so on. Interaction with the wrapped content that is initiated within the wrapped content can proceed outside the visual bounds of the wrapped content such that the content can be scrolled as looped content.

In implementations, a wrap thumb is employed that can be manipulated to navigate wrapped content. Interaction with the wrapped content can cause the wrap thumb to be visually removed from the wrapped content. After the interaction is discontinued, the wrap thumb can be redisplayed in a position that corresponds to a position for one or more portions of the wrapped content.

In implementations, a wrap thumb can be cropped during an interaction with wrapped content to indicate a scrolling position of items and/or portions the wrapped content.

In the following discussion, an example environment is first described that is operable to employ techniques for wrapped content interaction described herein. Next, a section entitled "Wrapped Content Interactions" describes example interactions with wrapped content in accordance with one or more embodiments. Following this, a section entitled "Example Methods" describes some example methods in accordance with one or more embodiments. Last, a section entitled "Example System and Device" describes aspects of an example system and an example device that can be utilized to implement one or more embodiments.

Example Environment

Figure 1:
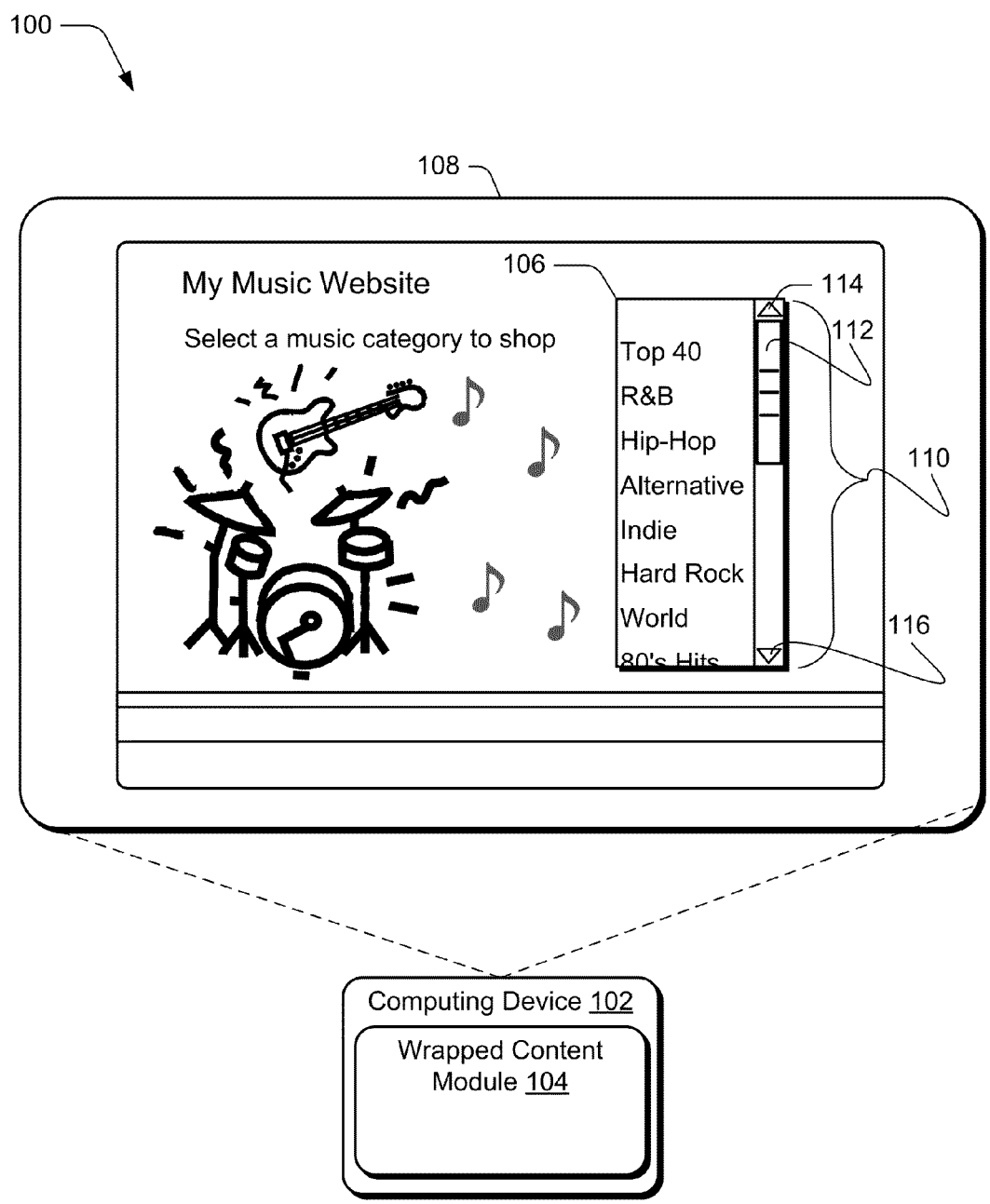
FIG. 1 is an illustration of an environment in an example implementation in accordance with one or more embodiments.

FIG. 1 is an illustration of an environment 100 in an example implementation that is operable to employ techniques for wrapped content interaction described herein. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIGS. 7 and 8. Thus, the computing device 102 may range from full resource devices with substantial memory and processor resources (e.g., personal computers, game consoles) to a low-resource device with limited memory and/or processing resources (e.g., traditional set-top boxes, handheld game consoles). The computing device 102 also includes software that causes the computing device 102 to perform one or more operations as described below.

Computing device 102 includes a wrapped content module 104 that is operational to provide techniques for wrapped content interaction as described in this document. The wrapped content module 104 can be implemented in connection with any suitable type of hardware, software, firmware or combination thereof. In at least some embodiments, the wrapped content module 104 is implemented in software that resides on some type of tangible, computer-readable storage medium examples of which are provided below.

The wrapped content module 104 is representative of functionality to recognize a user interaction with wrapped content via a scrollbar and enable the user to navigate the wrapped content using scrollbar instrumentalities. User interaction with wrapped content can be recognized by the wrapped content module 104 in a variety of ways. For example, the wrapped content module 104 may be configured to recognize that a user is interacting with wrapped content by manipulating a cursor, e.g., using a mouse, a keyboard, and so on. The wrapped content module may recognize other forms of input as well, such as touch input, touchless gesture input, and so on.

Further to such embodiments, the environment 100 includes a wrapped content window 106 that is displayed via a display device 108 of the computing device 102. The wrapped content window 106 is configured to present content that can be scrolled through the wrapped content window. In this particular example, the wrapped content window 106 includes a list of items that can be scrolled and selected via user interaction with the wrapped content window. For instance, in the illustrated example, the wrapped content window 106 includes a wrap scrollbar 110 that represents functionality to navigate through the wrapped content window. Further to such functionality, the wrap scrollbar 110 includes a wrap thumb 112, an up arrow 114, and a down arrow 116. The wrap thumb 112 can be manipulated within the wrap scrollbar 110 to scroll content through the wrapped content window 106, e.g., by dragging the wrap thumb with a cursor. As is discussed in more detail below, the wrap thumb 112 can also be manipulated partially and/or completely out of the wrapped content window 106 as part of a scrolling interaction with the wrapped content window.

In addition to the wrap thumb 112, the up arrow 114 and the down arrow 116 present instrumentalities that are selectable to cause content to scroll through the wrapped content window 106. For example, the up arrow 114 can be selected to scroll content downward through the wrapped content window 106. In implementations, selecting and holding the up arrow 114 can cause content to continuously scroll downward as a wrapped loop through the wrapped content window 106. Similarly, the down arrow 116 can be selected to scroll content upward through the wrapped content window 106. Selecting and holding the down arrow 116 can cause content to continuously scroll upward as a wrapped loop through the wrapped content window 106. While embodiments are illustrated herein with reference to scrolling list items in a user interface, it is to be appreciated that any type of manipulation and/or navigation of visual items may be employed within the spirit and scope of the claimed embodiments. Further aspects of wrapped content interaction are discussed in detail below.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the wrapped content interaction techniques described below are platform-independent, meaning that the techniques may be implemented on a variety of commercial computing platforms having a variety of processors.

Having discussed an example environment, consider now some example wrapped content interactions in accordance with one or more embodiments.

Wrapped Content Interactions

In one or more embodiments, wrapped content is presented that displays visually looped content such that a user can scroll through the content multiple times via manipulation of the content in a particular direction. Described below are some example wrapped content interactions in accordance with one or more embodiments. The wrapped content interactions can be implemented via the wrapped content module 104, described above with reference to the environment 100.

Figure 2:
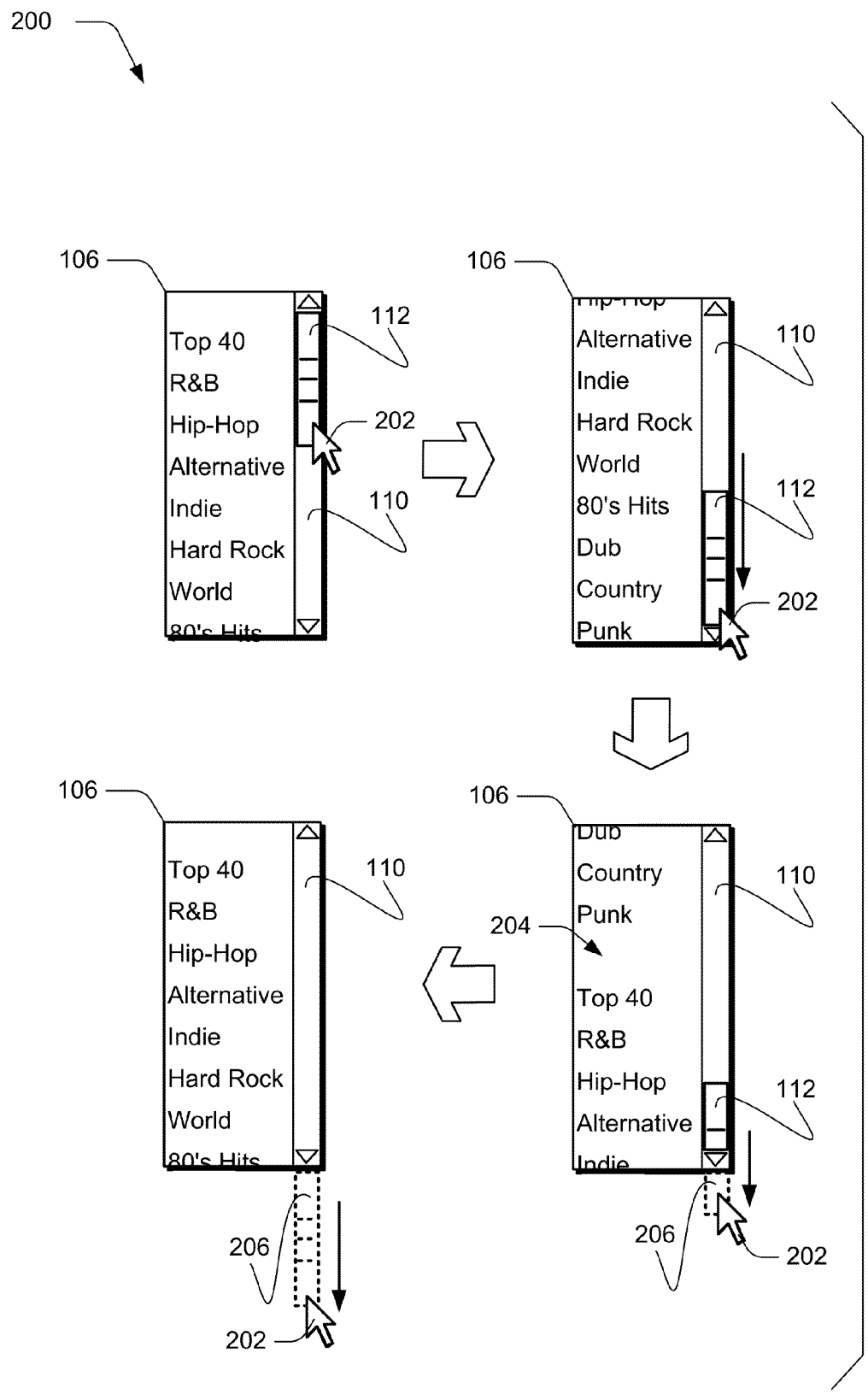
FIG. 2 illustrates a wrapped content scenario in accordance with one or more embodiments.

FIG. 2 illustrates a wrapped content scenario 200 in accordance with one or more embodiments. In the upper left portion, the wrapped content window 106 is displayed with the wrap scrollbar 110 and its associated instrumentalities. Continuing from the upper left to the upper right portion, the wrap thumb 112 is selected using a cursor 202 and dragged downward through the wrap scrollbar 110. This causes content in the wrapped content window 106 to scroll upward through the window. As illustrated, some content portions leave the wrapped content window at the top, e.g., the "Top 40" and "R&B" content portions. Also, some content portions that were not previously displayed enter the wrapped content window 106 from the bottom, e.g., the "Dub," "Country," and "Punk" content portions. The "Punk" content portion is the last item in the content, as illustrated by the wrap thumb 112 being situated at the bottom of the wrap scrollbar 110.

Continuing from the upper right to the lower right portion of the wrapped content scenario 200, the cursor 202 continues to be dragged downward, beyond the bottom edge of the wrapped content window 106. This causes several things to occur. First, content portions in the wrapped content window continue to scroll upward. Thus, manipulation of the cursor 202 outside of the wrapped content window 106 and/or the wrap scrollbar 110 can cause scrolling behavior within the wrapped content window.

Second, the wrap thumb 112 is visually cropped at the bottom of the wrap scrollbar 110. In implementations, visually cropping the wrap thumb 112 can provide a visual affordance that additional content exists outside of the currently displayed content and that the cursor 202 may continue to be manipulated outside of the wrapped content window 106 to scroll content.

In embodiments, the visual cropping of the wrap thumb 112 is implemented to correspond to a position of content portions in the wrapped content window 106. For example, when the wrap thumb 112 reaches the bottom of the wrap scrollbar 110 and begins to be visually cropped (e.g., as illustrated in the bottom right portion), this indicates that all of the content has been scrolled through the wrapped content window 106 and that a first content portion (e.g., the "Top 40" content portion) has re-entered the wrapped content window. Further, when the top edge of the wrap thumb 112 reaches the bottom edge of the wrapped content window 106 and the wrap thumb disappears (e.g., as illustrated in the lower left portion), this indicates that the first content portion is positioned at its home position at the top of the wrapped content window 106. Thus, wrap thumb cropping can provide a further visual affordance with respect to a position of a particular content portion (e.g., a first content portion, a last content portion, and so on) in a content window.

Also illustrated at the bottom right portion is a content separator 204, which is representative of a blank separation object that denotes a separation between a first portion of the content portions (e.g., the "Top 40" content portion), and a last portion of the content portions, e.g., the "Punk" content portion. The content separator 204 presents a visual reference point within the content portions to enable a user to understand when they have scrolled through all portions of an instance of content. For example, if the user scrolls the content such that the content separator 204 leaves the bottom of the wrapped content window 106 and then reenters the top of the wrapped content window, this indicates that the user has scrolled through the entirety of the content. While the content separator 204 is illustrated as a blank item (e.g., a null item), this is not intended to be limiting. For example, any suitable item that can denote a separation between portions of content may be utilized within the spirit and scope of the claimed embodiments.

Further illustrated is a thumb ghost 206, which is used for purposes of illustrating a virtual position of the wrap thumb 112. In implementations, the thumb ghost 206 is not displayed during an actual interaction with the wrapped content window 106, and a viewer simply sees the cursor 202 moving outside the bounds of the wrapped content window.

Continuing from the lower right to the lower left portion of the wrapped content scenario 200, the cursor 202 continues to be dragged downward away from the bottom edge of the wrapped content window 106. This causes the content to continue scrolling upward through the wrapped content window 106, and the wrap thumb 112 to disappear from view.

Figure 3:
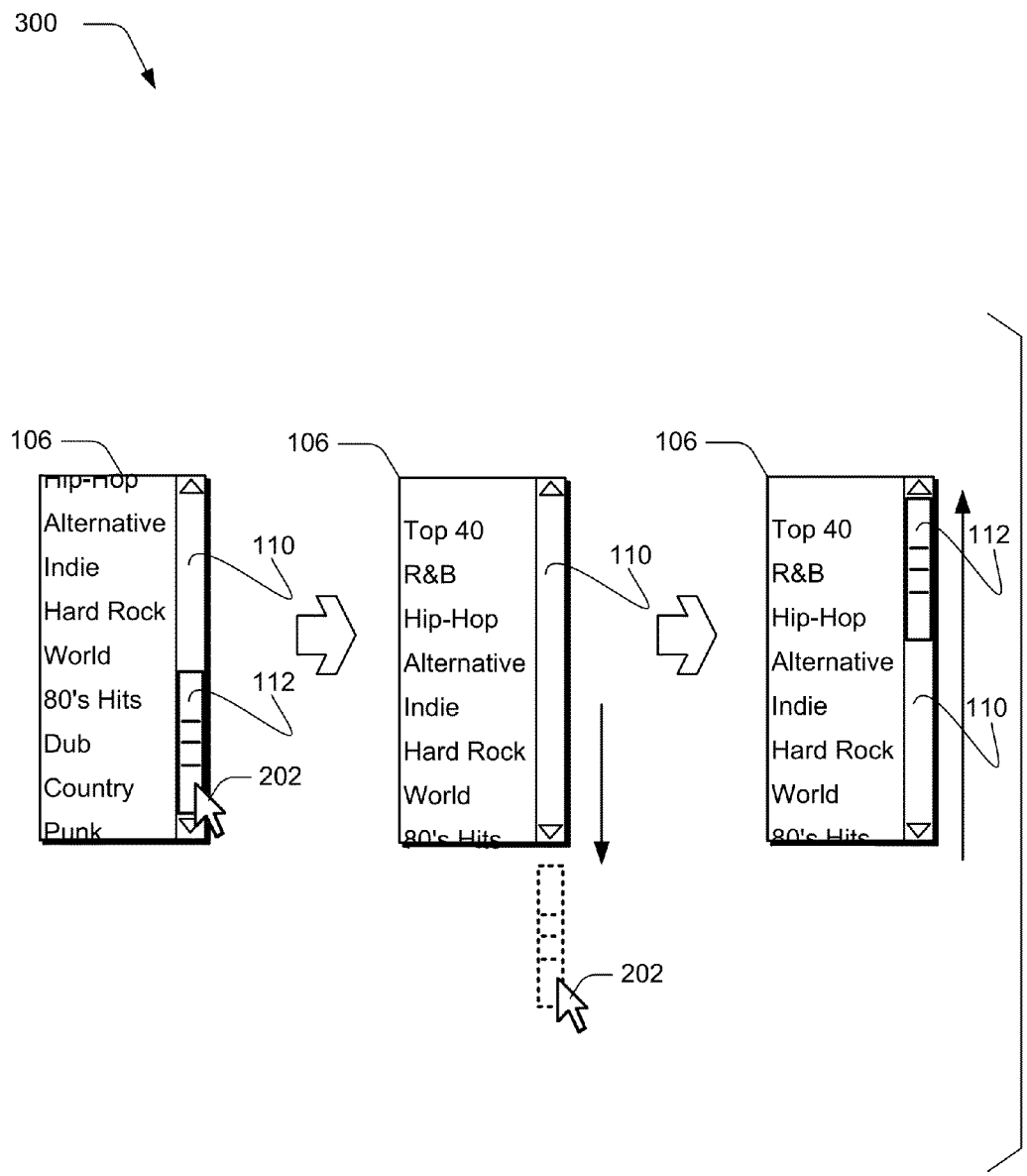
FIG. 3 illustrates a wrapped content scenario in accordance with one or more embodiments.

FIG. 3 illustrates a wrapped content scenario 300 in accordance with one or more embodiments. Starting at the left portion, the wrapped content window 106 is displayed with the wrap thumb 112 selected by the cursor 202. For example, a user can "mouse down" while the cursor is positioned over the wrap thumb 112, to cause the cursor the grab the wrap thumb. Continuing to the center portion, the cursor 202 drags the wrap thumb 112 out of the bottom of the wrap scrollbar 110. For example, a mouse down operation that grabbed the wrap thumb can continue as the cursor 202 is manipulated downward beyond the bottom edge of the wrapped content window 106. As discussed above, content portions in the wrapped content window 106 continue to be scrolled as wrapped content in response to manipulation of the cursor 202 outside the bounds of the wrapped content window.

Continuing to the right portion of the content scenario 300, the dragging operation is terminated, e.g., in response to a "mouse up" action. This causes the wrap thumb 112 to be redisplayed in the wrap scrollbar 110. For example, the wrap thumb 112 can animate into the wrap scrollbar 110 from the bottom.

As illustrated, when the wrap thumb 112 is redisplayed, it is redisplayed at a position that is relative to content portions displayed in the wrapped content window 106. For example, the wrap thumb is redisplayed at the top of the wrap scrollbar 110, which indicates that a first content portion (e.g., the "Top 40" content portion) is at the top of the wrapped content window 106. Thus, embodiments enable a user to interact with the wrapped content window by selecting the wrap thumb 112 and manipulating it out of view. When it is unselected (e.g., a scrolling interaction is discontinued), the wrap thumb 112 is redisplayed in the wrap scrollbar 110 at a position that is relative to particular content portions displayed and/or associated with the wrapped content window 106.

Figure 4:
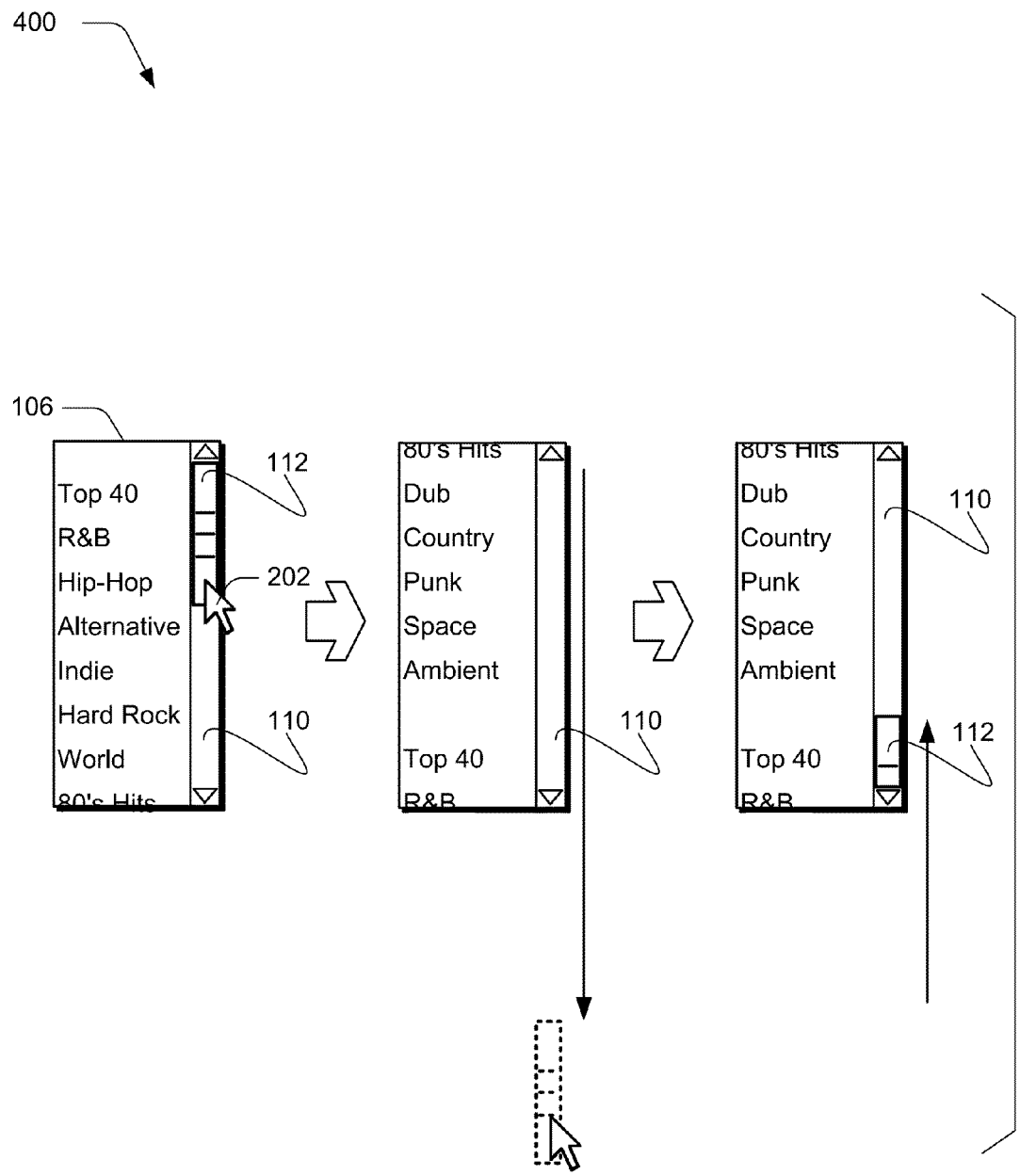
FIG. 4 illustrates a wrapped content scenario in accordance with one or more embodiments.

FIG. 4 illustrates a wrapped content scenario 400 in accordance with one or more embodiments. Starting at the left portion, the wrapped content window 106 is displayed with the wrap thumb 112 selected by the cursor 202. Continuing to the center portion, the cursor 202 drags the wrap thumb 112 out of the bottom of the wrap scrollbar 110.

Continuing on to the right portion of the content scenario 400, the dragging operation is terminated, e.g., in response to a "mouse up" action. This causes the wrap thumb 112 to be redisplayed in the wrap scrollbar 110. As illustrated, when the wrap thumb 112 is redisplayed, it is cropped at the bottom of the wrap scrollbar 110. As discussed above, the wrap thumb 112 can be cropped to indicate a position of particular content portions in the wrapped content window 106, e.g., a position of a first content portion, a middle portion, a last content portion, and so on. Thus, embodiments enable the wrap thumb to be manipulated out of view and then redisplayed in the wrap scrollbar 110 in a visually cropped manner that corresponds to a position of particular content portions in the wrapped content window 106.

While the wrapped content scenarios above are discussed with reference to manipulation of a wrap thumb downward through a wrapped content window, this is presented for purposes of illustration only. Accordingly, it is to be appreciated that techniques for wrapped content interaction discussed herein can be employed to navigate content in a variety of directions relative to the portions of the content, such as upward, downward, sideways, and/or any combination thereof. Thus, in embodiments, techniques discussed herein can be employed to scroll content, pan content, or any combination thereof without departing from the spirit and scope of the claimed embodiments.

Having discussed some example wrapped content interactions, consider now some example methods in accordance with one or more embodiments.

Example Methods

Discussed below are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the aspects of the methods can be implemented via interaction between various entities discussed above with reference to the environment 100 and below with reference to the system 700.

Figure 5:
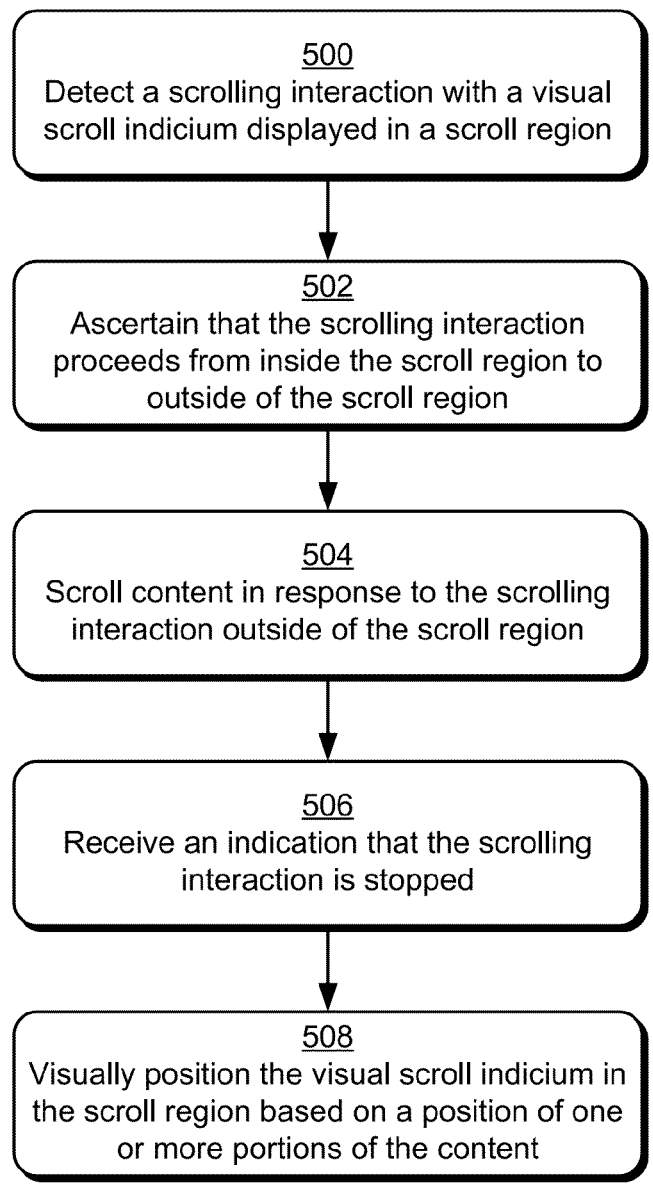
FIG. 5 is a flow diagram that describes steps in a method in accordance with one or more embodiments.

FIG. 5 is a flow diagram that describes steps in a method in accordance with one or more embodiments. In at least some embodiments, the method can be implemented by a wrapped content module, such as the one described in FIG. 1. Step 500 detects a scrolling interaction with a visual scroll indicium displayed in a scroll region. For example, a user can select and manipulate the wrap thumb 112 displayed in the wrap scrollbar 110, described above in FIGS. 1-4.

Step 502 ascertains that the scrolling interaction proceeds from inside the scroll region to outside of the scroll region. For example, a user can drag the wrap thumb 112 outside of the wrap scrollbar 110 and/or the wrapped content window 106. Step 504 scrolls content in response to the scrolling interaction outside of the scroll region. For instance, content portions displayed in the wrapped content window 106 can scroll as wrapped content in response to manipulation of the wrap thumb 112 outside of the wrap scrollbar 110 and/or the wrapped content window 106. In implementations, manipulation of the wrap thumb 112 in any direction and/or at any angle relative to the wrap scrollbar 110 and/or the wrapped content window 106 can cause a corresponding scrolling of the content.

Step 506 receives an indication that the scrolling interaction is stopped. For example, a user can mouse up on the cursor 202. Step 508 visually positions the visual scroll indicium in the scroll region based on a position of one or more of the portions of the content. For instance, the wrap thumb 112 can be redisplayed in the wrapped content window 106 at a position that corresponds to one or more content portions associated with the wrapped content window.

Figure 6:
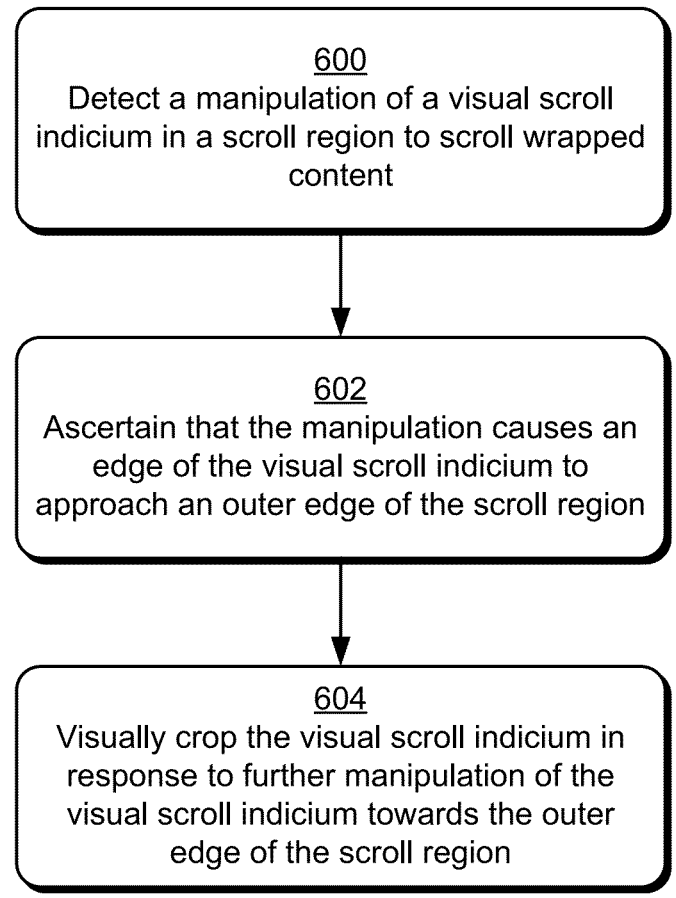
FIG. 6 is a flow diagram that describes the steps in a method in accordance with one or more embodiments.

FIG. 6 is a flow diagram that describes steps in a method in accordance with one or more embodiments. In at least some embodiments, the method can be implemented by a wrapped content module, such as the one described in FIG. 1.

Step 600 detects a manipulation of a visual scroll indicium in a scroll region to scroll wrapped content. Step 602 ascertains that the manipulation causes an edge of the visual scroll indicium to approach an outer edge of the scroll region. For example, the wrap thumb 112 can be manipulated to the upper edge and/or the lower edge of the wrap scrollbar 110. Step 604 visually crops the visual scroll indicium based on further manipulation of the visual scroll indicium towards the outer edge of the scroll region. As discussed above, the wrap thumb 112 can be visually cropped to correspond to a relative position of one or more portions of content in the wrapped content window 106.

Having described some example methods, consider now an example system and an example device that can be utilized to implement one more embodiments described above.

Example System and Device

Figure 7:
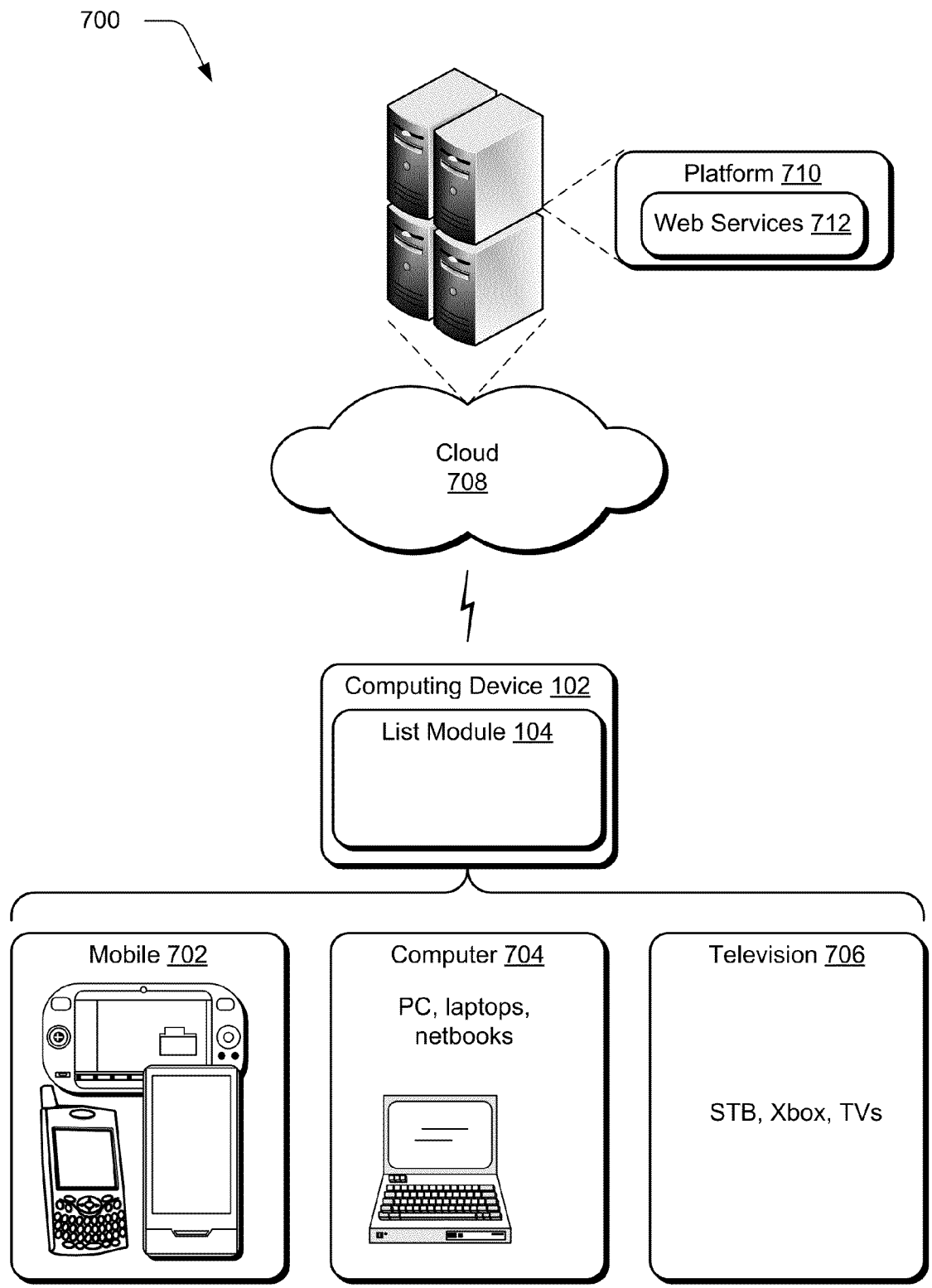
FIG. 7 is an illustration of a system in an example implementation showing FIG. 1 in greater detail.

FIG. 7 illustrates an example system showing the wrapped content module 104 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices.

For example, as previously described the computing device 102 may be configured in a variety of different ways, such as for mobile 702, computer 704, and television 706 uses. Each of these configurations has a generally corresponding screen size and thus the computing device 102 may be configured as one of these device classes in this example system 700. For instance, the computing device 102 may assume the mobile 702 class of device which includes mobile telephones, music players, game devices, and so on. The computing device 102 may also assume a computer 704 class of device that includes personal computers, laptop computers, netbooks, and so on. The television 706 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 708 is illustrated as including a platform 210 for web services 212. The platform 710 abstracts underlying functionality of hardware (e.g., servers) and software resources of the cloud 708 and thus may act as a "cloud operating system." For example, the platform 710 may abstract resources to connect the computing device 102 with other computing devices. The platform 710 may also serve to abstract scaling of resources to provide a corresponding level of scale to encountered demand for the web services 712 that are implemented via the platform 710. A variety of other examples are also contemplated, such as load balancing of servers in a server farm, protection against malicious parties (e.g., spam, viruses, and other malware), and so on.

Thus, the cloud 708 is included as a part of the strategy that pertains to software and hardware resources that are made available to the computing device 102 via the Internet or other networks. For example, the wrapped content module 104 may be implemented in part on the computing device 102 as well as via a platform 210 that supports web services 212.

For example, the techniques supported by the wrapped content module 104 may implemented via input detected using touchscreen functionality in the mobile configuration 702, track pad functionality of the computer 704 configuration, detected by a camera as part of support of a natural user interface (NUI) that does not involve contact with a specific input device, and so on. Further, performance of the operations to detect and recognize the inputs to identify a particular gesture may be distributed throughout the system 700, such as by the computing device 102 and/or the web services 712 supported by the platform 710 of the cloud 708.

Figure 8:
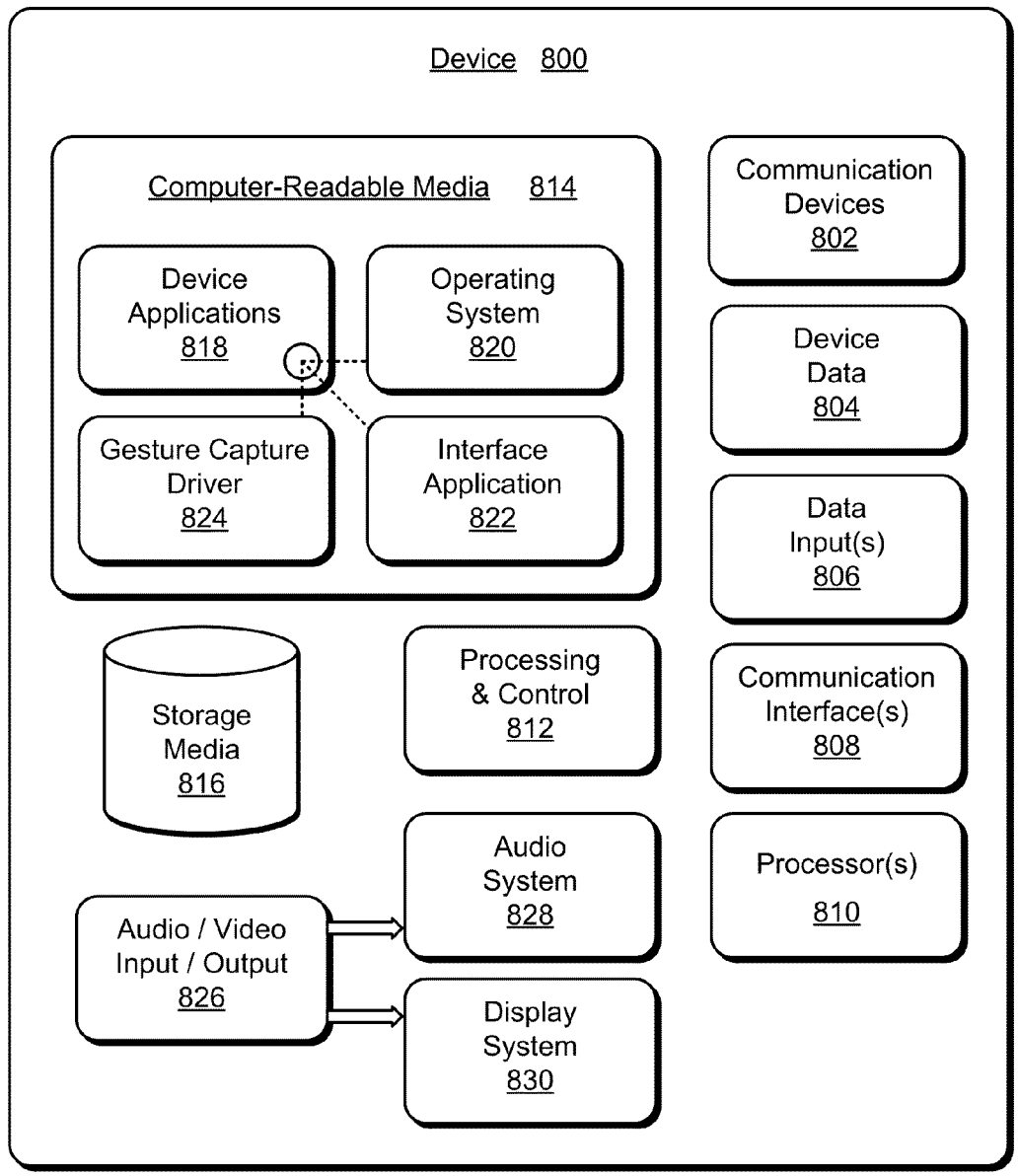
FIG. 8 illustrates an example computing device that can be utilized to implement various embodiments described herein.

FIG. 8 illustrates various components of an example device 800 that can be implemented as any type of portable and/or computer device as described with reference to FIGS. 1 and 7 to implement embodiments of the techniques for wrapped content interaction described herein. Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable or readable instructions to control the operation of device 800 and to implement the embodiments described above. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable media 814 provides data storage mechanisms to store the device data 804, as well as various device applications 818 and any other types of information and/or data related to operational aspects of device 800. For example, an operating system 820 can be maintained as a computer application with the computer-readable media 814 and executed on processors 810. The device applications 818 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 818 also include any system components or modules to implement embodiments of the techniques described herein. In this example, the device applications 818 include an interface application 822 and a gesture-capture driver 824 that are shown as software modules and/or computer applications. The gesture-capture driver 824 is representative of software that is used to provide an interface with a device configured to capture a gesture, such as a touchscreen, track pad, camera, and so on. Alternatively or in addition, the interface application 822 and the gesture-capture driver 824 can be implemented as hardware, software, firmware, or any combination thereof.

Device 800 also includes an audio and/or video input-output system 826 that provides audio data to an audio system 828 and/or provides video data to a display system 830. The audio system 828 and/or the display system 830 can include any devices that process, display, and/or otherwise render audio, video, and image data. Video signals and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

Conclusion

Techniques for wrapped content interaction are described. Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A method comprising:
   detecting a scrolling interaction with a visual scroll indicium displayed in a scroll region associated with content displayed in a content window adjacent to the scroll region;
   ascertaining that the scrolling interaction with the visual scroll indicium proceeds from inside the scroll region, across an exterior bound of the scroll region, to outside of the scroll region and continues outside of the scroll region;
   scrolling the content within the content window as wrapped content in response to the scrolling interaction continuing outside of the scroll region;
   receiving an indication that the scrolling interaction is stopped;
   stopping scrolling the content such that both a beginning and an end of the content are visible within the content window;
   displaying the visual scroll indicium as a cropped visual scroll indicium responsive to both the beginning and the end of the content being visible within the content window; and
   ascertaining that the scrolling interaction with the visual scroll indicium continues outside of the scroll region such that the visual scroll indicium is first cropped within the scroll region and then removed from view during the scroll interaction outside of the scroll region.

2. The method of claim 1, wherein said scroll region comprises a scrollbar displayed adjacent to the content window that includes one or more portions of the content.

3. The method of claim 1, wherein the content comprises one or more of a list of items, a document, or a webpage.

4. The method of claim 1, wherein said scrolling interaction comprises one or more of a mouse interaction, a keyboard interaction, or a touch interaction.

5. The method of claim 1, wherein the scrolling interaction comprises a manipulation of the visual scroll indicium with a cursor.

6. The method of claim 1, wherein the scrolling interaction proceeds from inside the scroll region to outside of the scroll region via at least one of a top edge of the scroll region, a bottom edge of the scroll region, or a side edge of the scroll region.

7. The method of claim 1, wherein said scrolling comprises scrolling through the content multiple times in response to the scrolling interaction outside of the scroll region.

8. The method of claim 1, further comprising visually cropping the visual scroll indicium to correspond to a visual position of one or more portions of the content in response to said ascertaining that the scrolling interaction with the visual scroll indicium proceeds from inside the scroll region, across an exterior bound of the scroll region, to outside of the scroll region.

9. The method of claim 1, further comprising causing the visual scroll indicium to be removed from a display region in which the scroll region is displayed in response to said ascertaining that the scrolling interaction with the visual scroll indicium continues outside of the scroll region such that the visual scroll indicium is not displayed during said scrolling.

10. The method of claim 9, further comprising redisplaying the visual scroll indicium at a position in the scroll region that corresponds to a position of one or more portions of the content, said redisplaying being responsive to said receiving the indication that the scrolling interaction is stopped.

11. The method of claim 10, wherein said redisplaying comprises animating the visual scroll indicium into the position in the scroll region.

12. The method of claim 1, wherein the scroll region further comprises at least one selectable indicium that is selectable to cause the content to scroll continuously through the content window adjacent the scroll region.

13. One or more computer readable hardware storage devices embodying computer readable instructions which, when executed, perform operations comprising:
   detecting a scrolling interaction with a visual scroll indicium displayed in a scroll region associated with content displayed in a content window adjacent to the scroll region;
   ascertaining that the scrolling interaction with the visual scroll indicium proceeds from inside the scroll region, across an exterior bound of the scroll region, to outside of the scroll region and continues outside of the scroll region;
   scrolling the content within the content window as wrapped content in response to the scrolling interaction continuing outside of the scroll region;
   receiving an indication that the scrolling interaction is stopped;
   stopping scrolling the content such that both a beginning and an end of the content are visible within the content window;
   displaying the visual scroll indicium as a cropped visual scroll indicium responsive to both the beginning and the end of the content being visible within the content window; and
   ascertaining that the scrolling interaction with the visual scroll indicium continues outside of the scroll region such that the visual scroll indicium is first cropped within the scroll region and then removed from view during the scroll interaction outside of the scroll region.

14. The one or more computer readable hardware storage devices of claim 13, wherein the operations further comprise redisplaying the visual scroll indicium at a position in the scroll region that corresponds to a position of one or more portions of the content, said redisplaying being responsive to said receiving the indication that the scrolling interaction is stopped.

15. The one or more computer readable hardware storage devices of claim 14, wherein said redisplaying comprises animating the visual scroll indicium into the position in the scroll region.

16. The one or more computer readable hardware storage devices of claim 14, wherein the indication that the scrolling interaction outside of the scroll region is stopped comprises a mouse up operation.

17. The one or more computer readable hardware storage devices of claim 13, wherein said scroll region comprises a scrollbar, and wherein said visual scroll indicium comprises a scroll thumb associated with the scrollbar.

18. A system comprising:
   one or more processors;
   one or more computer-readable hardware storage media storing instructions that are executable by the one or more processors to perform operations including:
      detecting a scrolling interaction with a visual scroll indicium displayed in a scroll region associated with content displayed in a content window adjacent to the scroll region;
      ascertaining that the scrolling interaction with the visual scroll indicium proceeds from inside the scroll region, across an exterior bound of the scroll region, to outside of the scroll region and continues outside of the scroll region;
      scrolling the content within the content window as wrapped content in response to the scrolling interaction continuing outside of the scroll region;
      receiving an indication that the scrolling interaction is stopped;
      stopping scrolling the content such that both a beginning and an end of the content are visible within the content window;
      displaying the visual scroll indicium as a cropped visual scroll indicium responsive to both the beginning and the end of the content being visible within the content window; and
      ascertaining that the scrolling interaction with the visual scroll indicium continues outside of the scroll region such that the visual scroll indicium is first cropped within the scroll region and then removed from view during the scroll interaction outside of the scroll region.

19. The system of claim 18, wherein the operations further comprise redisplaying the visual scroll indicium at a position in the scroll region that corresponds to a position of one or more portions of the content, said redisplaying being responsive to said receiving the indication that the scrolling interaction is stopped.

20. The system of claim 18, wherein said scroll region comprises a scrollbar, and wherein said visual scroll indicium comprises a thumb associated with the scrollbar.

* * * * *